Aug. 3, 1965 R. E. LACKEY ETAL 3,199,015

CONTROL CIRCUIT INCLUDING A FAST ACTING
TRANSISTOR REGULATOR IN PARALLEL WITH
A SLOW ACTING MAGNETIC
AMPLIFIER REGULATOR

Filed Oct. 23, 1961 2 Sheets-Sheet 1

ROBERT E. LACKEY
STANLEY A. LACKEY
INVENTORS

BY George B. Oujevolk
ATTORNEY

CONTROL CIRCUIT INCLUDING A FAST ACTING TRANSISTOR REGULATOR IN PARALLEL WITH A SLOW ACTING MAGNETIC AMPLIFIER REGULATOR

Filed Oct. 23, 1961 2 Sheets-Sheet 2

ROBERT E. LACKEY
STANLEY A. LACKEY
INVENTORS

BY George B. Oujevolk
ATTORNEY 3,199,015

CONTROL CIRCUIT INCLUDING A FAST ACTING TRANSISTOR REGULATOR IN PARALLEL WITH A SLOW ACTING MAGNETIC AMPLIFIER REGULATOR

Robert E. Lackey, Saratoga County, and Stanley A. Lackey, Warren County, N.Y., assignors to Espey Mfg. & Electronics Corp., Saratoga Springs, N.Y., a corporation of New York Filed Oct. 23, 1961, Ser. No. 146,986
7 Claims. (Cl. 321—19)

This invention relates to power supply systems and more particularly to a system of providing a regulated D.C. output from an A.C. source.

The type of power supply system to which the present invention relates comprises a source of power, an output, and a transfer circuit to supply power from the source to the output including a regulating circuit to provide for widely varying loads on the output and maintain a relatively constant voltage at the output. Prior to the present invention, it was known to use magnetic amplifiers to provide this regulation and it was known to use transistor circuits to provide this regulation. Such power supply systems which are regulated by magnetic amplifiers are highly efficient but have a poor dynamic response and are ineffective to prevent output voltage fluctuations when there are sudden changes in the output power requirements. The power supply systems which are regulated by means of transistors, on the other hand, have fast dynamic response but are relatively inefficient, expensive and unreliable.

In the system of the present invention, regulation is provided by a transistor circuit in conjunction with a magnetic amplifier. The transistor circuit provides the fast dynamic response required to prevent output fluctuations caused by line and load transients and ripple. The transistor circuit, however, provides a minor share of the regulation at equilibrium so that transistor dissipation is reduced, cost is reduced, and reliability is improved relative to a fully transistorized supply system.

Accordingly, the principal object of the present invention is to provide an improved power supply system.

Another object of this invention is to provide a reliable, efficient and relatively inexpensive power supply system with good dynamic response.

A further object of this invention is to provide a power supply system regulated by a transistor circuit and magnetic amplifier combination.

Further objects and advantages of the present invention will become readily apparent as the following detailed description of the invention unfolds, and when taken into conjunction with the drawings wherein.

Figure 1:
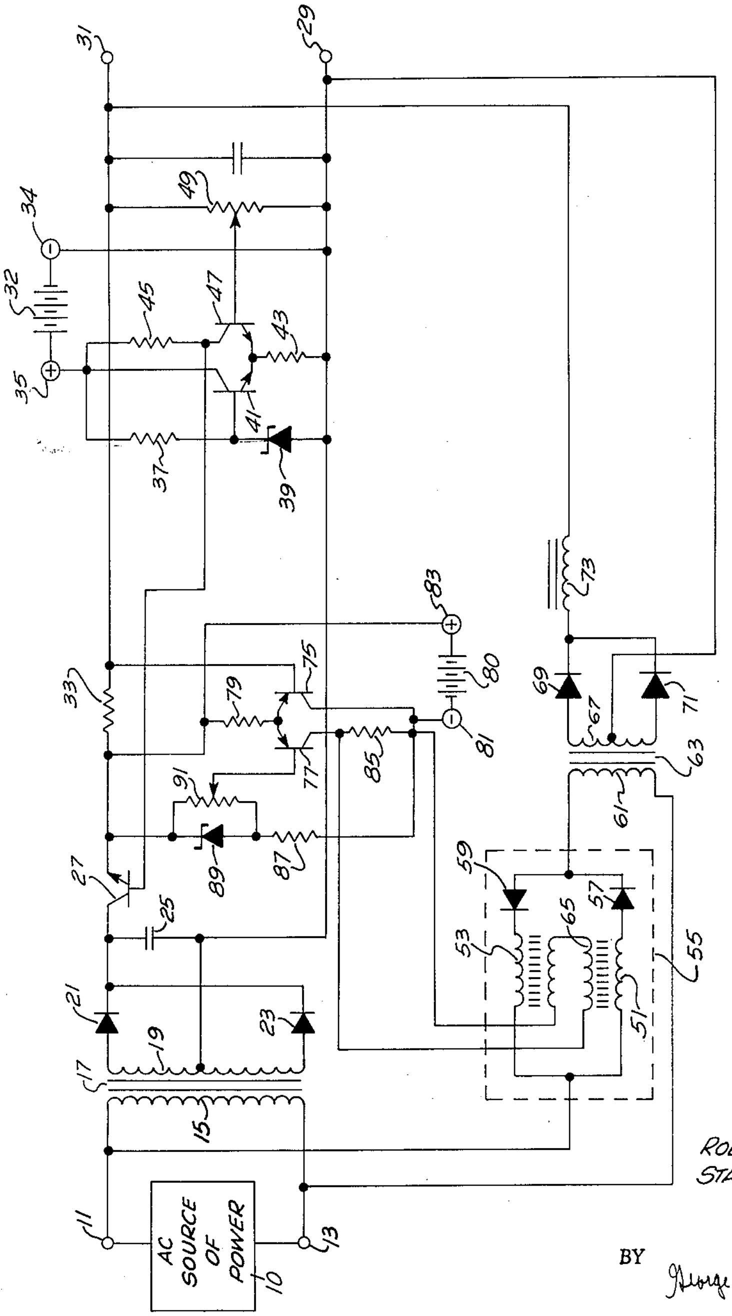
FIG. 1 is a circuit diagram of one embodiment of the invention.

As shown in FIG. 1 an A.C. power source 10 is connected across terminals 11 and 13. The terminal 11 is connected to load windings 51 and 53 of a magnetic amplifier 55. The load winding 51 is connected in series with a rectifier 57 and the load winding 53 is connected in series with a rectifier 59. These two series circuits are connected in parallel and between the input terminal 11 and one side of the primary winding 61 of a transformer 63. The other side of the primary winding 61 is connected directly to the input terminal 13. The rectifiers 57 and 59 are poled so that the load windings 51 and 53 pass current on alternate half cycles. The amount of voltage and power applied to the primary winding 61 of the transformer 63 is controlled by the magnetic amplifier 55 as determined by the amount of current flowing through a control winding 65 of the magnetic amplifier. The output terminals of the power supply system are designated 29 and 31. The transformer 63 has a center tapped secondary winding 67, the end terminals of which are connected to the anodes of rectifiers 69 and 71 respectively. The cathodes of the rectifiers 69 and 71 are connected together and through an inductor 73 to an output terminal 31 of the system. The center tap of the secondary winding 67 is connected directly to the output terminal 29. The rectifiers 69 and 71 provide a full wave rectified voltage between their commonly connected cathodes and the center tap of the transformer winding 67 and this rectified voltage is applied across the output terminals 29 and 31 through the inductor 73. The inductor 73 serves to filter out ripple from the full wave rectified voltage. Thus, D.C. power is supplied to the output terminals 31 and 29 from the A.C. source 10 through the transformer 63 and the magnetic amplifier 55. The positive side of the voltage is applied to terminal 31 and the negative side to terminal 29. The amount of D.C. power supplied through this circuit is controlled by the magnetic amplifier 55 as determined by the current flowing in the control winding 65.

The primary winding 15 of a transformer 17 is also connected across the terminals 11 and 13. The transformer 17 has a center tapped secondary winding 19, the end terminals of which are connected to the anodes of rectifiers 21 and 23 respectively. The cathodes of the rectifiers 21 and 23 are connected together and to one side of a capacitor 25. The center tap of the winding 19 is connected to the other side of the capacitor 25. The A.C. voltage from the source 10 after being induced in the secondary winding 19 of the transformer 17 is rectified by means of the rectifiers 21 and 23 to provide a D.C. voltage across the capacitor 25, which serves to filter out the ripple in the full wave rectified output from the rectifiers 21 and 23. The positive side of the D.C. voltage across capacitor 25 at the junction between capacitor 25 and the rectifiers 21 and 23 is connected to the collector of an NPN transistor 27. The negative side of the D.C. voltage across capacitor 25 at the junction of the capacitor 25 and the center tap of the secondary winding 19 is connected to the output terminal 29 of the power supply system. The emitter of the transistor 27 is connected to the other output terminal 31 of the regulator system through a resistor 33. In this manner the D.C. voltage generated across the capacitor 25 is applied to the output terminals 31 and 29 through the transistor 27 and the resistor 33. Thus, D.C. power is supplied to the output terminals 31 and 29 from the source 10 through the transformer 17 and the transistor 27.

The positive side of D.C. source 32 is applied to a terminal 35. The negative side of the source 32 is applied to a terminal 34 connected to the output terminal 29. Terminal 35 is connected through a series circuit of a resistor 37 and a Zener diode 39 to the output terminal 29. The junction between the Zener diode 39 and the resistor 37 is connected to the base of an NPN transistor 41, the collector of which is connected to the positive potential at terminal 35 and the emitter of which is connected to the output terminal 29 through a resistor 43. The Zener diode applies a constant reference voltage between the base of the transistor 41 and the output terminal 29. The positive potential at terminal 35 is also connected through a resistor 45 to the collector of an NPN transistor 47, the emitter of which is connected to the emitter of the transistor 41. The base of the transistor 47 is connected to the movable tap of a potentiometer 49 which is connected across the output terminals 29 and 31. The transistor 41 acts as an emitter follower and reproduces the reference voltage applied between its base and the output terminal 29 across the emitter load resistor 43. The transistor 47 then amplifies the difference between this voltage and the voltage applied to its base between the movable tap of the potentiometer 49 and the output terminal 29. The transistor 47 produces an amplified signal at its collector in the form of a potential varying linearly wtih the difference between the voltage across resistor 43 and the voltage between the movable tap of the potentiometer 49 and the output terminal 29. Since the voltage across resistor 43, being set by the Zener diode 39, is constant, the potential produced at the collector of the transistor 47 will vary linearly with the voltage between the movable tap of the potentiometer 49 and the output terminal 29. Since this voltage will be proportional to the output across terminals 31 and 29, the amplified signal in the form of the potential at the collector of the transistor 47 will vary linearly with the voltage across the output terminals 29 and 31. The collector of the transistor 47 is connected to the base of the transistor 27 and so the amplified signal at the collector of transistor 47 controls the current flowing through transistor 27. Thus, when the voltage across the output terminals 29 and 31 starts to drop as a result of a sudden increase in the load across these output terminals, this voltage drop will cause a corresponding voltage drop between the base of the transistor 47 and the output terminal 29. This action will cause an increase in the output signal potential produced at the collector of the transistor 47 and applied to the base of the transistor 27, thus increasing the conduction through the transistor 27. In this manner the D.C. power supplied to the output terminals is increased and the tendency of the voltage across the output terminals 31 and 29 to drop when the load is increased is counteracted. In a similar manner the D.C. power supplied to the output terminals 31 and 29 is reduced in response to a decrease in the load across output terminals 31 and 29 tending to cause a voltage rise across the output terminals 29 and 31. Because of the amplification that occurs in the transistors 47 and 27 only a small change in the voltage across the terminals 31 and 29 will cause a large change in the conduction through the transistor 27. As a result, the voltage across the terminals 31 and 29 will be maintained relatively constant even though the load across the terminals 31 and 29 varies widely. Because of its good dynamic response, this regulating circuit comprising the transistors 41, 47, and 27 will maintain the output voltage constant even though the load across the terminals 31 and 29 changes quickly and will substantially reduce any ripple in the output voltage across output terminals 31 and 29.

The amount of current flowing through the control winding 65 of the magnetic amplifier 55 is controlled by an amplifier circuit which senses the amount of current flowing through the resistor 33 and applies a corresponding amplified current to the winding 65. This amplifier circuit comprises a pair of PNP transistors 75 and 77, the emitters of which are connected together and through a resistor 79 to the junction between the emitter of the transistor 27 and the resistor 33. The base of the transistor 75 is connected to the other side of the resistor 33, or in other words to the output terminal 31. The collector of the transistor 75 is connected to the negative side of a D.C. source 80 applied to a terminal 81. The positive side of this D.C. source is applied at a terminal 83, which is connected to the junction between the emitter of the transistor 27 and the resistor 33. The collector of the transistor 77 is collected to the negative potential at terminal 81 through a resistor 85. The terminal 81 is also connected to the junction between the emitter of the transistor 27 and the resistor 33 through a series circuit of a resistor 87 and a Zener diode 89 which is connected to operate in its breakdown region and thus provide a reference voltage. A potentiometer 91 is connected in parallel with the Zener diode 89 and the movable tap of the potentiometer 91 is connected to the base of the transistor 77. Because of the constant drop by the Zener diode 89, a constant reference voltage will be applied between the base of the transistor 77 and the junction between the emitter of the transistor 27 and the resistor 33. The transistor 75 reproduces across the emitter load resistor 79 the voltage across the resistor 33 and this voltage is compared with the voltage between the base of transistor 77 and the junction between the emitter of the transistor 27 and the resistor 33. The difference between these two voltages is amplified in the transistor 77, which produces an amplified output signal voltage across the collector load resistor 85. This amplified signal voltage will vary linearly with the voltage drop across resistor 33 and therefore with the conduction through transistor 27. The control winding 65 of the magnetic amplifier 55 is connected across the load resistor 85. As a result a current having an amplitude varying linearly with the conduction through a transistor will flow through the control winding 65 of the magnetic amplifier 55. Thus when the current flowing through the resistor 33 increases causing an increased voltage drop across this resistor 33, the transistor 77 as a result will conduct less reducing the voltage drop across the load resistor 85. As a result, the current flowing through the control winding 65 will drop. The polarity of the control winding 65 is such that a drop in the current flowing therethrough will cause an increase in the power transferred through the load windings 51 and 55, and as a result increased power will be supplied from the source 10 through the transformer 63 to the output terminals 31 and 29. In a similar manner a decrease in the current flowing through resistor 33 will cause a decrease in the power supplied from the source 10 through the magnetic amplifier 55 and the transformer 63 to the output terminals 31 and 29. Thus, when the load on the output terminals increases, the conduction through the transistor 27 increases causing an increase in the power supplied to the output terminals through the transformer 17. In response to this action, the magnetic amplifier 55 in turn increases the power supplied to the output terminals 31 and 29 through the transformer 63. Similarly, when the load across the output terminals 31 and 29 decreases, the conduction through the transistor 77 will decrease and the power supplied to the output through the transformer 17 will decrease. In response to this action the magnetic amplifier 55 will decrease the amount of power supplied to the output terminals through the transformer 63. Thus, the magnetic amplifier 55 serves to regulate the output at terminals 31 and 29 and maintain the voltage across the terminals 31 and 29 constant in response to the regulating action of the transistor 27 and changes in the load across the terminals 31 and 29 are provided for by the action of both the transistor 27 and the magnetic amplifier 55. Because of the amplification provided by the transistors 75 and 77 as well as by the magnetic amplifier 55 itself, only a small change in the conduction through the transistor 27 will cause a large change in the power flowing through the magnetic amplifier. As a result, most of the regulation at equilibrium is provide by the magnetic amplifier 55.

When the load across the terminals 29 and 31 changes suddenly tending to cause a voltage drop across the output terminals 31 and 29, this tendency will be first counteracted by the transistor circuitry comprising the transistors 41, 47 and 27 and as a result, increased current will flow through the transistor 27 to the output terminals 29 and 31 preventing the output voltage across these terminals to drop substantially. The increased current flowing through the resistor 33 is sensed by the transistors 75 and 77, which in response thereto decrease the current flowing through the control winding 65 of the magnetic amplifier permitting increased power to be supplied through the transformer 63 to the output terminals 29 and 31. Because of the slower response of the magnetic amplifier, this power increase will not be supplied to the output terminals immediately, but will be supplied thereto after a short time interval required for the system to reach equilibrium. In the meantime, the output voltage across the output terminals 29 and 31 is maintained by the power supplied through the transformer 17. When the power supplied through the transformer 63 starts to increase as a result of the increased current flowing through the resistor 33, the power supplied through the transformer 17 will automatically decrease again so that the majority of the change in total power supplied to the output terminals will be supplied through the transformer 63 and the magnetic amplifier 55. Thus at equilibrium most of the regulation is provided by the magnetic amplifier 55. Because of this feature, a more efficient, reliable, and less expensive system is provided. Nevertheless, because of the fast acting regulation provided by transistors 27, 41 and 47, the output voltage across terminals 31 and 29 is maintained substantially constant even when the load across terminals 31 and 29 changes suddenly and any ripple in the output voltage is substantially reduced.

Figure 2:
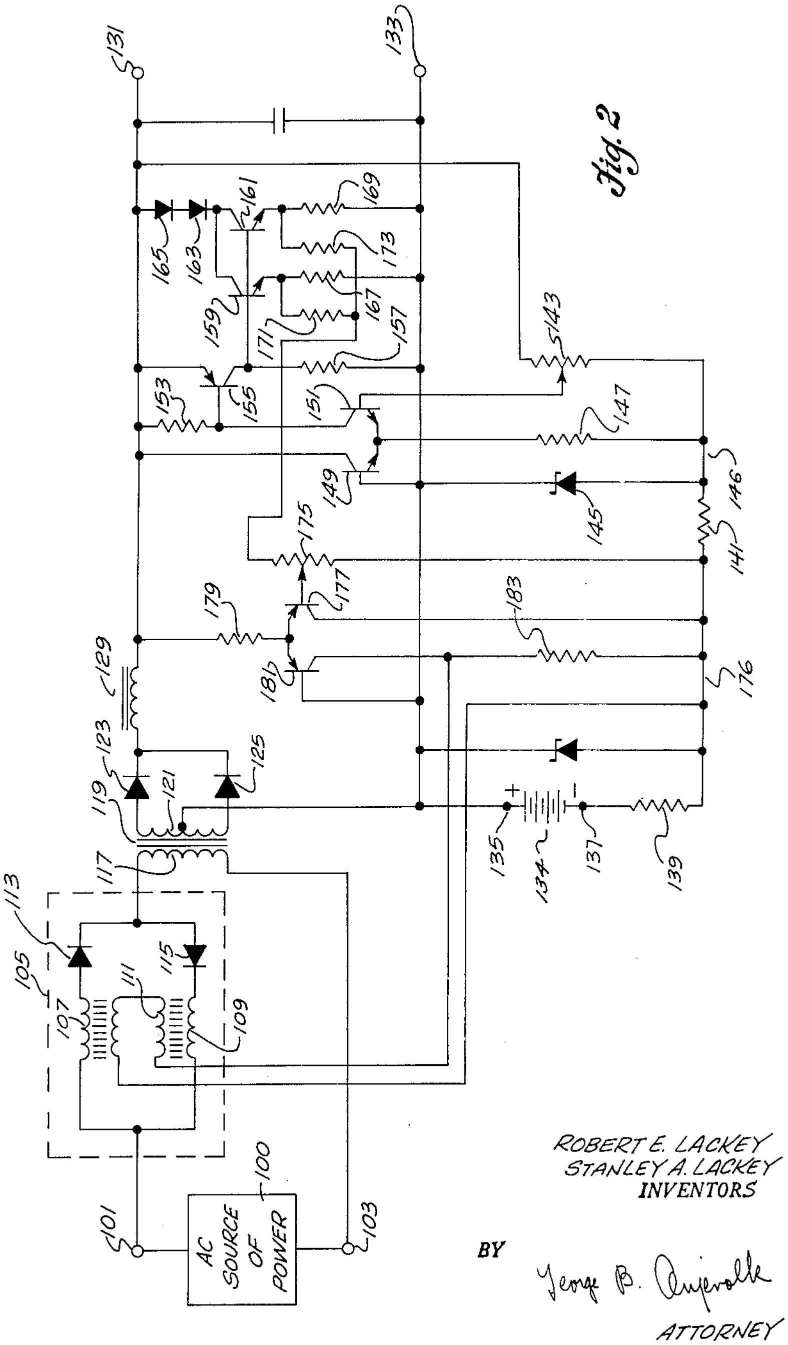
FIG. 2 shows a circuit diagram of another embodiment of the invention.

In the embodiment of the invention shown in FIG. 2, an A.C. source 100 is connected across terminals 101 and 103. The terminal 101 is connected to a magnetic amplifier 105, which comprises two load windings 107 and 109 and a control winding 111. The load winding 107 is connected in series with a rectifier 113 and the load winding 109 is connected in series with rectifier 115. The series circuit of the load winding 109 and the rectifier 115 is connected in parallel with series circuit comprising the load winding 107 and the rectifier 113. The parallel circuit comprising the windings 107 and 109 and the rectifiers 113 and 115 is connected between the input terminal 101 and one side of the primary winding 117 of a transformer 119. The other side of the primary winding 117 is connected to the input terminal 103. The diode rectifiers 113 and 115 are oppositely poled so that the windings 107 and 109 pass alternate cycles between the source 100 and the primary winding 117. With this circuitry the A.C. power across terminals 101 and 103 is supplied to the primary winding 117 and the transformer 119. The amount of power supplied to the primary winding 117 is determined by the current flowing in the control winding 111 of the magnetic amplifier 105. The transformer 119 has a center tapped secondary winding 121, the end terminals of which are connected to the anodes of rectifiers 123 and 125 respectively. The cathodes of the rectifiers 123 and 125 are connected together and through an inductor 129 to a terminal 131, which comprises one of the output terminals of the system. The other output terminal 133 of the system is connected directly to the center tap of the secondary winding 121. The A.C. voltage produced in the secondary winding 121 is rectified by the rectifiers 123 and 125 and a full wave rectified voltage will be produced between the commonly connected cathodes of the rectifiers 123 and 125 and the center tap of the secondary winding 121. This resulting D.C. voltage is applied to the output terminals 131 and 133 through the inductor 129, which filters out the ripple in the full wave rectified D.C. voltage. The plus side of the D.C. voltage output will be at terminal 131 and the negative side of the D.C. voltage output will be at terminal 133.

The system is provided with a source of D.C. voltage 134, the positive side of which is applied at terminal 135 and the negative side of which is applied at terminal 137. The terminal 135 is connected directly to the output terminal 133 and the terminal 137 is connected through a series circuit of resistors 139 and 141 and a potentiometer 143 to the output terminal 131. A Zener diode 145 is connected from the junction 146 between the resistor 141 and the potentiometer 143 to the terminal 133. The Zener diode 145 is operated in its breakdown region so that a constant voltage is provided between the output terminal 133 and the junction 146. The junction 146 is connected by means of a resistor 147 to the emitters of a pair of NPN transistors 149 and 151. The base of the transistor 149 is connected to the output terminal 133 and the base of the transistor 151 is connected to the movable tap on the potentiometer 143. The collector of the transistor 149 is connected directly to the output terminal 131 and the collector of the transistor 151 is connected to output terminal 131 through a resistor 153. The transistor 149 is thus connected as an emitter follower and produces across the resistor 147 a voltage drop equal to the reference voltage developed across the Zener diode 145. Because the voltage drop between the junction 146 and the output terminal 131 is maintained constant by the Zener diode 145, any change in voltage across the output terminals 131 and 133 will cause the same change in voltage across the potentiometer 143. Therefore the voltage developed between the movable tap of the potentiometer 143 and the junction 146 will vary linearly with the output voltage developed across terminals 131 and 133. The transistor 151 amplifies the difference between the voltage applied between its emitter and junction 146 and the voltage applied between its base and junction 146, and as a result, produces an output potential at its collector which varies linearly with the output voltage produced across the terminals 131 and 133. When the voltage across terminals 131 and 133 decreases the voltage between the base of transistor 151 and junction 146 will correspondingly decrease. This will cause the conduction through the transistor 151 to decrease and an amplified linear increase in the potential at the collector of the transistor 151 will result. In a similar manner an increase in the voltage across the output terminals 131 and 133 will cause an amplifier linear decrease in the potential at the collector of the transistor 151. The collector of the transistor 151 is connected to the base of a PNP transistor 155, the emitter of which is connected directly to the output terminal 131 and the collector of which is connected to the output terminal 133 through a resistor 157. When the potential applied to the base of a PNP transistor 155 from the collector of the transistor 151 increases, the conduction through the transistor 155 will decrease and an amplified linear decrease in the potential at the collector of the transistor 155 will result. Similarly a decrease in potential at the collector of the transistor 151 will cause an amplified linear increase in the potential at the collector of the transistor 155. The collector of the transistor 155 is connected to the bases of a pair of NPN transistors 159 and 161, the collectors of which are connected together and through a pair of series connected diodes 163 and 165 to the terminal 131. The diodes 163 and 165 are poled to permit current flow from the terminal 131 to the collectors of the transistors 159 and 161 and serve to provide a voltage drop between the terminal 131 and the collectors of the transistors 159 and 161. The emitter of the transistor 159 is connected through a resistor 167 to the output terminal 133 and the emitter of the transistor 161 is connected to the output terminal 133 through a resistor 169. The conduction through the transistors 159 and 161 varies linearly with the potential at the collector of the transistor 155. When the potential at the collector of the transistor 155 decreases, the conduction through the transistors 159 and 161 will decrease linearly, and when the potential of the collector of the transistor 155 increases the conduction through the transistors 159 and 161 will increase linearly. Thus, when the voltage across the output terminals 131 and 133 drops, this will cause a decrease in the conduction through the transistors 159 and 161 thus making more current available to the output terminals 131 and 133, and in this way the drop in output voltage across the output terminals 131 and 133 is counteracted. If the output voltage across the output terminals 131 and 133 should increase, the conduction through the transistors 159 and 161 would be increased, thus reducing the amount of current available to the output terminals and counteracting the increase in the output voltage across terminals 131 and 133. Because of the amplification provided by the transistors 151, 155 as well as by the transistors 159 and 161 a very small change in the output voltage across terminals 131 and 133 will cause a large change in the conduction through transistors 159 and 161 to counteract it. Therefore the output voltage will be maintained substantially constant by the action of the transistors 149, 151, 155, 159 and 161. This regulation will have good dynamic response so that sharp increases or decreases in the load across the output terminals are quickly provided for before the output voltage across terminals 131 and 133 can change appreciably. The action of this regulation is fast enough to substantially reduce any ripple in the output voltage. It will be noted that when there is a sharp increase in the load across the output terminals 131 and 133 tending to cause a decrease in output voltages from these terminals, that transistors 151 and 155, as well as the transistor 159 and 161, decrease in conductivity. This decrease in conductivity of the transistors 151 and 155 also serves to provide more output current to the output terminals 131 and 133, and thereby counteracts the tendency of the output voltage to decrease.

The emitters of the transistors 159 and 161 are connected through resistors 171 and 173 respectively to a common junction, which is connected through a potentiometer 175 to the junction 176 between resistors 139 and 141. A Zener diode operating in its breakdown region, is connected between the junction 176 and the output terminal 133 and thus maintains a constant voltage between the junction 176 and the output terminal 133. The movable tap of potentiometer 175 is connected to the base of a PNP transistor 177, the collector of which is connected to the junction 176 and the emitter of which is connected to the output terminal 131 through a resistor 179. The change in conductivity of the transistors 159 and 161 results in a linear change in the potential at the emitters of the transistors 159 and 161. As a result, the potential at the movable tap of the potentiometer 175 will change linearly, and this action in turn will cause a linear change in the potential at the emitter of the transistor 177, which is connected as an emitter follower. When the conduction through the transistors 159 and 161 decreases as caused by a tendency of the output voltage across terminals 131 and 133 to decrease, the potential at the emitters of the transistors 159 and 161 will become more negative and as a result, the potential at the emitter of the transistor 179 will become linearly more negative. Similarly an increase in the conduction through transistors 159 and 161 will cause a linear increase in the potential at the emitter of the transistor 179. The emitter of transistor 179 is connected directly to the emitter of a transistor 181, the collector of which is connected to the junction 176 by a resistor 183 and the base of which is connected to the output terminal 133. The transistor 181 is thus connected as an amplifier and will produce a voltage across the collector load resistor 183 linearly amplified from the potential applied to the emitter of the transistor 181. When the potential at the emitter of the transistor 181 decreases as caused by a decrease in the conduction through the transistors 159 and 161, a corresponding decrease in the voltage across the load resistor 183 will occur. Similarly an increase in the potential at the emitter of transistor 181 will cause corresponding increase in the voltage across resistor 183. The control winding 11 of the magnetic amplifier 105 is connected across the load resistor 183 and as a result, the current flowing through the winding 111 will also linearly decrease with the potential at the emitter of the transistor 181. The control winding 111 is poled so that a decrease in the current flowing therethrough will increase the conduction through the magnetic amplifier and thus more power will be supplied from the source 100 through the magnetic amplifier 105 through the transformer 119 to the output terminals 131 and 133. In a similar manner, when the potential at the emitter of the transistor 181 increases the current flow through the control winding 111 increases and the conduction through the magnetic amplifier decrease. As a result less power will be supplied through the magnetic amplifier to the output terminals 131 and 133. Thus in response to a decrease in conduction through the transistors 159 and 161 the power supplied to the output terminals through the magnetic amplifier is increased and in response to an increase in conduction through the transistors 159 and 161 the power supplied to the output terminals through the magnetic amplifier 105 is decreased. Because of the amplification provided by the transistors 177 and 181 and the magnetic amplifier 105, a small change in conduction through the transistors 159 and 161 brings about a large change in the power supplied from the source 100 through the magnetic amplifier 105 so that under steady state conditions, the conduction through the transistors 159 and 161 remains relatively constant and when equilibrium is reached, after a change in the load across the terminals 131 and 133, most of the change will be provided for by the magnetic amplifier 105. However, the magnetic amplifier 105 has a poor dynamic response and when the load across the terminals 131 and 133 changes sudenly, the magnetic amplifier 105 cannot act fast enough to adjust to the suddenly changed load. The transistors 159 and 161, however, operating in response to the change in potential at the movable tap of the potentiometer 143 when there is a sudden change in the load across the terminals 131 and 133 acts quickly to change their conductivity to provide for the sudden change in load and maintain the voltage across the output terminals 131 and 133 relatively constant. Then when the magnetic amplifier 105 has had time to respond to the change in conduction through the transistors 159 and 161, it will provide for the change in load across the output terminals 131 and 133, and the conduction in the transistors 159 and 161 will return to its relatively constant equilibrium value.

Both of the above power supply systems act quickly to provide for sudden changes in load, thus preventing fluctuations in the output voltage due to load and line transients. This good dynamic response is achieved because transistors are used to provide for sudden changes in load. However, because the transistors supply a minor share of the regulation at equilibrium, dissipation by transistors is reduced and thus the efficiency is improved relative to supply systems which are fully regulated by transistors. Similarly, the cost is reduced and the reliability of the system is improved.

Many modifications may be made to the above described specific embodiment of the invention without departing from the spirit and scope thereof which is limited only as defined in the appended claims.

What is claimed is:

1. In a regulated power supply system wherein A.-C. current from a power source is converted and supplied to an output by a transfer circuit as D.-C. current, the improvement therein to prevent output fluctuation when there are sudden changes in the load, comprising, a low efficiency dynamic response first regulating means in said transfer circuit including rectifier means coupled to said power source, filter means fed by said rectifier means, and a transistor and load resistor fed by said filter means and responsive to the signal applied to the control side of said transistor; first sensing means across the output and coupled to said transistor control side to rapidly change the current value supplied across said transistor and load resistor in response to changes in the output load; a high efficiency slow second regulating means in said transfer circuit including a magnetic amplifier regulating the input from said power source to said second regulating means; and, second sensing means, sensing the current supplied across said transistor and load and coupled to said magnetic amplifier to change the input from said power source when there is a change in the load, said first and second regulating means being in parallel between said power source and said output.

2. In a regulated power supply system wherein A.-C. current from a power source is converted and supplied to an output by a transfer circuit as D.-C. current, the improvement therein to prevent output fluctuation when there are sudden changes in the load, comprising, a low efficiency dynamic response first regulating means in said transfer circuit including rectifier means coupled to said power source, filter means fed by said rectifier means, and a transistor and load resistor fed by said filter means and responsive to the signal applied to the control side of said transistor; first sensing means across the output and coupled to said transistor control side to rapidly change the current value supplied across said transistor and load resistor in response to changes in the output load; a high efficiency slow second regulating means in said transfer circuit including a magnetic amplifier regulating the input from said power source to said second regulating means; and, second sensing means, sensing the current supplied across said transistor and load and coupled to said magnetic amplifier to change the input from said power source when there is a change in the load, said second regulating means being coupled to said output, said first regulating means being in parallel with said output.

3. In a system as claimed in claim 1, said second regulating means being a first circuit including a first transformer and full wave rectifier coupled to said power source; a magnetic amplifier with control windings coupled to said first transformer and full wave rectifier controlling the power supplied in said first circuit; a ripple filter section coupled to the output side of said first transformer and full wave rectifier, and two output junction points coupled to the output of said ripple filter section; said first regulating means being a second circuit including a second transformer and full wave rectifier; a first transistor with a control side and resistor in said second circuit, in series with said output junction points, regulating the power supplied in said second circuit; a Zener diode, second transistor and emitter follower including a bias supply therefor coupled to one of said output junction points and to said first transistor control side, sensing the changes in the load at said output junction points and compensating therefor by a corresponding action on said control side so as to change the power supplied across said first transistor and, an amplifier circuit in parallel with said resistor including a bias supply therefor, coupled on its output side to said magnetic amplifier control windings, said amplifier circuit sensing the voltage drop across said resistor and controlling said magnetic amplifier in response to changes therein.

4. In a system as claimed in claim 2, said second regulating means including a transformer and full wave rectifier coupled to said power source; a magnetic amplifier with control windings coupled to said transformer and full wave rectifier controlling the output power therefrom, a ripple filter section coupled to the output of said transformer and full wave rectifier, and two output junction points; a Zener diode and resistor means including bias means shunted across said output junction points sensing any change in the load thereof; a first transistor and emitter follower circuit shunted across said output junction points responsive to said sensed change shunting changing current values across said output junction points in response thereto; a second transistor and emitter follower circuit including a sensing resistor means sensing the changing current supplied across said first transistor and emitter follower circuit and load resistor means coupled between the output of said second transistor circuit and said magnetic amplifier control windings, so as to control the output power from said transformer and full wave rectifier.

5. In a regulated power supply system wherein A.-C. current from a power source is converted and supplied to an output by a transfer circuit as D.-C. current, the improvement therein to prevent output fluctuations when there are sudden changes in the load, said improvement comprising in combination;

first circuit means including a transformer and full wave rectifier coupled to said power source, a ripple filter coupled to said full wave rectifier, output terminals from said full wave rectifier and ripple filter so that the A.-C. input from the power source is converted to a D.-C. output by said full wave rectifier and ripple filter and supplied to said output terminals as D.-C., and, a magnetic amplifier coupled to said transformer controlling the input from said power source to said full wave rectifier;

second circuit means including, leads to receive power from said first circuit means, a first Zener diode in said second circuit coupled to transistor emitter follower means and sensing resistor means in parallel with said output terminals coupled to said transistor emitter follower means, said emitter follower means supplying an output corresponding to variations in said sensing resistor means; dynamic regulating means shunted across said output terminals, including a control side, coupled and responsive to the output of said transistor emitter follower means immediately regulating the current flow in said output terminals in response to changes sensed by said sensing resistor means; and, second sensing resistor means coupled to said dynamic regulating means including second transistor emitter follower means sensing the output supplied by said dynamic regulating means and coupled on the output side thereof to said magnetic amplifier, regulating the output across said first transformer in accordance with the output from said dynamic regulating means.

6. In a regulated power supply system wherein A.-C. current from a power source is converted and supplied to an output by a transfer circuit as D.-C. current, the improvement therein to prevent output fluctuations when there are sudden changes in the load said improvement comprising in combination, first circuit means including, a first transformer and full wave rectifier coupled to said power source; a ripple filter coupled to said full wave rectifier, output terminals from said full wave rectifier and ripple filter so that the A.-C. input from the power source is converted to D.-C. by said full wave rectifier and ripple filter and supplied to the said output terminals as D.-C., and, a magnetic amplifier coupled to said first transformer controlling the input from said power source to said full wave rectifier;

second circuit means including, a second transformer and second full wave rectifier coupled to said power source; a second ripple filter coupled to said second full wave rectifier; the output from said second ripple filter being also coupled to said output terminals; a first transistor in said second circuit with its emitter and collector in series with one of said output terminals and a load resistor in series with said emitter and collector, the output across said transistor depending on the bias signal applied to the base control side thereof;

a Zener diode, second transistor and emitter follower, including a bias supply therefor coupled to said output terminals and to said first transistor control side, sensing the changes in the load at said output terminals and compensating therefor by a corresponding action on said first transistor control side so as to change the output across said first transistor; and, an amplifier sensing circuit in parallel with said load resistor in said second circuit means and coupled to said magnetic amplifier, said amplifier sensing circuit sensing the changes across said load resistor and controlling said magnetic amplifier in response to said changes therein, said amplifier sensing circuit including a second Zener diode and amplifier transistor means in parallel with said load resistor, the base control side of the amplifier transistor means being responsive to the input across said second Zener diode and supply an output to said magnetic amplifier, regulating the output of said first transformer.

7. In a regulated power supply system wherein A.-C. current from a power source is converted and supplied to an output by a transfer circuit as D.-C. current, the improvement therein to prevent output fluctuations when here are sudden change in the load, said improvement comprising in combination, a high efficiency slow response regulating means including, a transformer and full wave rectifier coupled to said power source; a ripple filter coupled to said full wave rectifier, output terminals from said full wave rectifier and ripple filter so that the A.-C. input from the power source is converted to a D.-C. output by said full wave rectifier and ripple filter and supplied to said output terminals as D.-C., and a magnetic amplifier coupled to said transformer controlling the input from said power source to said full wave rectifier;

a low efficiency dynamic response regulating means, shunted across said output terminals in parallel with said transformer and full wave rectifier, including, a first Zener diode coupled to transistor emitter follower means and a load resistor in parallel with said output terminals, sensing resistor means in parallel therewith coupled to said transistor emitter follower means, said emitter follower means supplying an output corresponding to variations in said sensing resistor means; a transistor shunt circuit across said output terminals, the control side thereof being responsive to said transistor emitter follower means, shunting current thereacross in response to a rise across the output terminals and preventing current thereacross in response to a drop across the output terminals; and, a second sensing resistor means fed by said transistor shunt circuit the output of which is fed to a second transistor emitter follower means sensing the current across said transistor shunt circuit and coupled on the output side thereof to said magnetic amplifier decreasing or increasing the output across said transformer in response to an increase or decrease output across said transistor shunt circuit.

References Cited by the Examiner

UNITED STATES PATENTS

| | | | |
|---|---|---|---|
| 2,903,640 | 9/59 | Bixby | 323—22 |
| 2,942,174 | 6/60 | Harrison | 323—22 |
| 3,042,848 | 3/62 | Muchnick et al. | 321—10 |
| 3,114,873 | 12/63 | Love | 323—22 |
| 3,122,694 | 2/64 | Muchnick et al. | 321—16 |

LLOYD McCOLLUM, *Primary Examiner.*